E. E. MATTHEWS.
Corn-Planter.
No. 167,552. Patented Sept. 7, 1875.
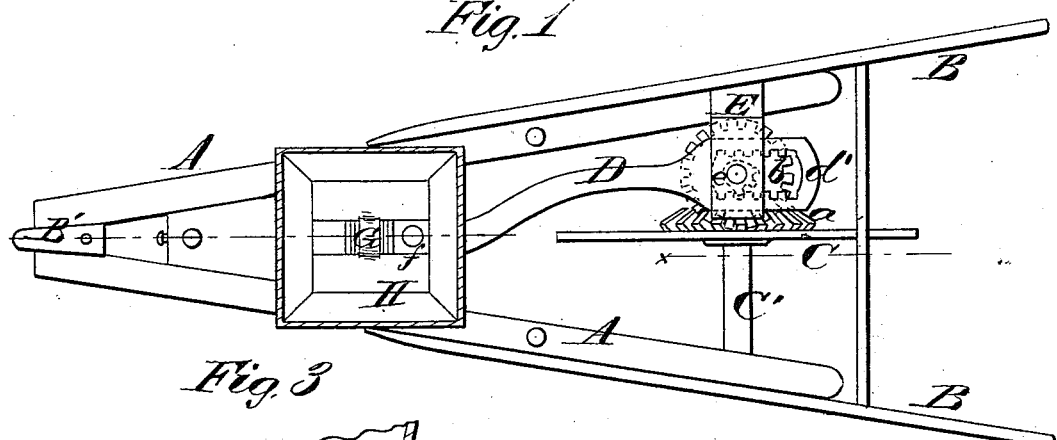
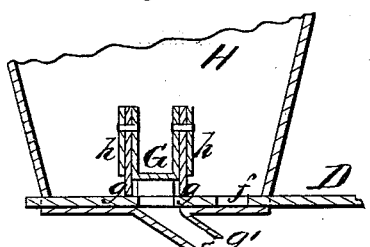
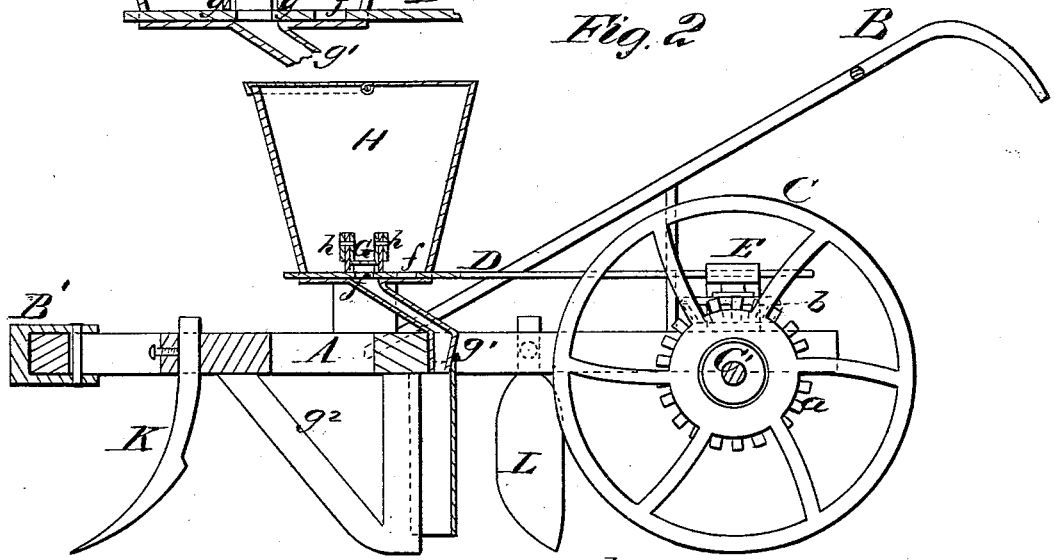
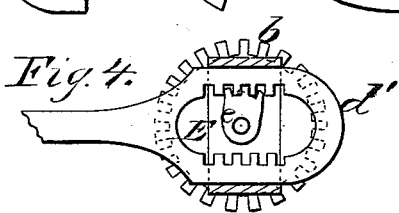
WITNESSES
Mary F. Utley.
M. Carroll
INVENTOR
Elias E. Matthews,
Chipman Hosmer & Co
ATTORNEYS

UNITED STATES PATENT OFFICE.

ELIAS E. MATTHEWS, OF MUNCIE, INDIANA.

IMPROVEMENT IN CORN-PLANTERS.

Specification forming part of Letters Patent No. 167,552, dated September 7, 1875; application filed January 9, 1875.

*To all whom it may concern:*

Be it known that I, ELIAS E. MATTHEWS, of Muncie, in the county of Delaware and State of Indiana, have invented a new and valuable Improvement in Corn-Planter or Drill; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my corn-planter. Fig. 2 is a vertical longitudinal sectional view of the same, and Figs. 3 and 4 are sectional detail views.

This invention has relation to machines for planting corn; and it consists in a novel device for communicating a rectilinear reciprocating motion to the dropping-slide of the planter from a supporting and driving wheel, located in rear of the hopper, as will be hereinafter explained.

In the annexed drawings, A designates a triangular frame, to which handles B B and a clevis, B', are attached. C designates a supporting and driving wheel, which is keyed on a shaft, C', and arranged at the rear end of the frame A. D designates a dropping-slide, working longitudinally through the bottom of the hopper H, and receiving its movements from the wheel C through the medium of bevel-wheels $a$ $b$, a toothed segment, $e$, on the shaft of wheel $b$, and a double rack, $d'$, on the rear end of the said slide. The racked portion of the slide D passes through, and is guided by, a bracket, E, and the segment $e$ receives a continuous rotary motion, its teeth acting alternately on the two racks. The slide D has two holes, $f\,f$, through it, which alternately move charges of corn over a dropping-tube, $g^1$, which conducts them into a drill, which is made by a tooth, K. The lower portion of the tube $g^1$ is applied at the rear part of a colter, $g^2$, the cutting-edge of which is inclined, in such manner that it will cut through stalks and weeds, and leave the drill open to receive the corn. In rear of the tube $g^1$ are two blades, L, which throw the loose earth over the corn in the drill. G designates a bridge, which extends over the slide D, and is rigidly secured to the bottom of the hopper, forming, in combination with two clearers, $g\,g$, a chamber, in which the corn is carried to be dropped into the tube $g^1$. The clearers $g\,g$ are elastic, and prevent more grains than a given charge from being moved under the bridge G. These clearers are confined in their places by means of clamping-plates $h\,h$, by removing which clearers which have become useless can be substituted by new ones.

I am aware that the feed-slides of droppers have heretofore been reciprocated to discharge the seed from the hopper, and I therefore lay no claim to such invention, broadly.

What I claim as new, and desire to secure by Letters Patent, is—

The dropping-slide D, having the double rack $d'$ at one end and perforations $f\,f$ at the other end, in combination with the hopper H, bevel-wheels $a$ $b$, and toothed segment $e$, substantially as and for the purpose set forth.

In testimony that I claim the above I have hereunto subscribed my name in the presence of two witnesses.

ELIAS E. MATTHEWS.

Attest:
WILLIAM W. ORR,
WILLIAM R. BROTHERTON.